United States Patent [19]

Hoberman

[11] Patent Number: 4,642,797
[45] Date of Patent: Feb. 10, 1987

[54] HIGH SPEED FIRST-IN-FIRST-OUT MEMORY

[75] Inventor: Barry A. Hoberman, Palo Alto, Calif.

[73] Assignee: Monolithic Memories, Inc., Santa Clara, Calif.

[21] Appl. No.: 551,735

[22] Filed: Nov. 10, 1983

[51] Int. Cl.[4] .............................................. G11C 13/00
[52] U.S. Cl. .................................... 365/221; 365/219; 365/239; 365/72; 364/900
[58] Field of Search ............... 365/219, 220, 221, 239, 365/78, 73, 77; 364/200 MS File, 900 MS File; 377/64, 66, 67, 77

[56] References Cited

U.S. PATENT DOCUMENTS

| | | | |
|---|---|---|---|
| 3,976,842 | 8/1976 | Hoyt | 381/34 |
| 4,151,609 | 4/1979 | Moss | 365/221 |
| 4,152,781 | 5/1979 | Aichelmann, Jr. | 365/77 |
| 4,374,428 | 2/1983 | Barnes | 364/900 |

FOREIGN PATENT DOCUMENTS

53-20825  2/1978  Japan ................................. 365/220

Primary Examiner—Terrell W. Fears
Attorney, Agent, or Firm—Alan H. MacPherson; Steven F. Caserza; Nathan N. Kallman

[57] ABSTRACT

A high speed M-stack fall-through FIFO memory system is disclosed which reduces fall-through delay and which permits at least a doubling of the maximum shift rates at input and output ports. Input port data may be entered in one of M physical memory locations and output port data may be read from one of M physical memory locations.

13 Claims, 12 Drawing Figures

HIGH SPEED FIRST-IN-FIRST-OUT MEMORY

BACKGROUND OF THE INVENTION

1. Field of The Invention

This invention is related to a first-in-first-out (FIFO) memory system and in particular to a high speed FIFO memory having a plurality of "fall-through" stacks.

2. Description of The Prior Art

Figure 1:
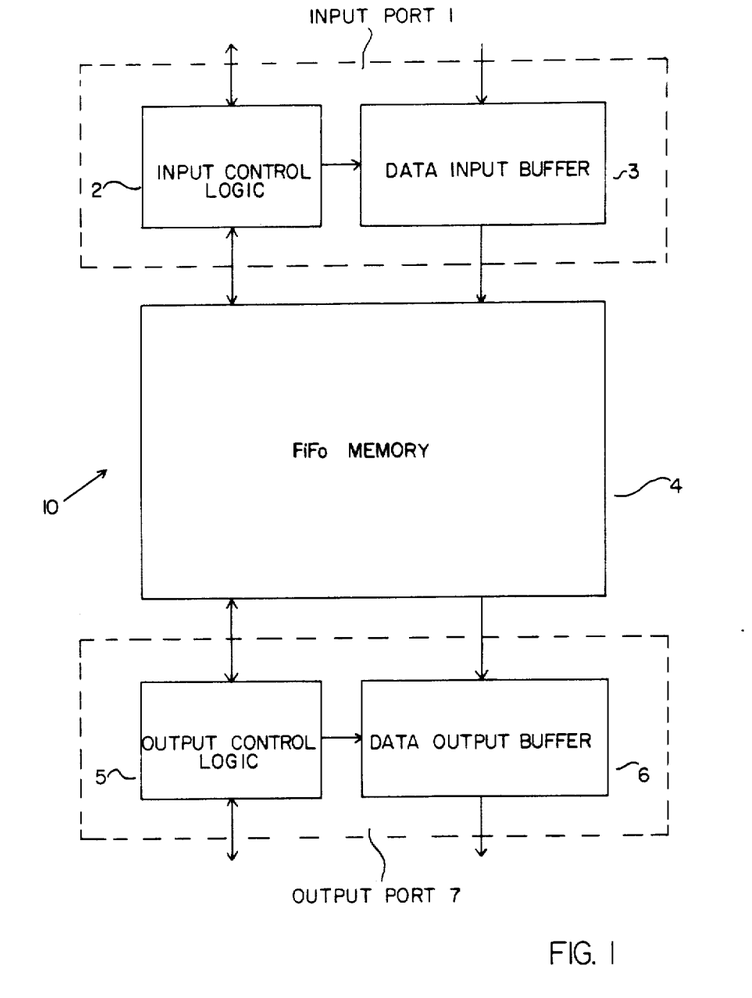
FIG. 1 shows the block diagram of a FIFO memory system.

FIG. 1 shows the block diagram of a FIFO memory system which is drawn broadly enough to encompass prior art FIFO memories as well as the FIFO memory system of the present invention.

This generic FIFO memory buffer 10 includes a FIFO memory 4 which allows the simultaneous writing of data through its input port 1 and the reading out of data through its output port 7, respectively. In addition a first-in-first-out protocol is imposed upon the data which is first written into and then read out of the memory.

Input control logic 2 provides information to the user describing whether the FIFO memory 4 is filled to capacity and also provides information to the user describing whether the FIFO memory is ready to receive additional data. Output control logic 5 provides information to the user describing whether the memory is empty and whether data is available to be read out of the memory. When the FIFO memory 4 is filled to capacity, the input control logic 2 prohibits additional data input to the FIFO memory 4. Similarly, when the FIFO memory 4 is empty, the output control logic 5 prohibits attempted removal of data from the FIFO memory 4.

The data input buffer 3 electrically buffers the input signals which appear at input port 1 and generates the voltage levels of the data input signals required by the FIFO memory 4 for proper operation.

The data output buffer 6 electrically buffers the signals representing a data word read-out of the FIFO memory 4 and presents the buffered signals to external circuitry (not shown).

The feature which distinguishes a FIFO memory system 10 from a standard shift register is the ability, when proper internal operating conditions are met, to operate the input and output ports completely asynchronously, including the reading and writing of data at different speeds.

Prior art FIFO memory systems can be divided into two classes which depend on their internal organization: fall-through systems and pointer-based systems.

Figure 2:
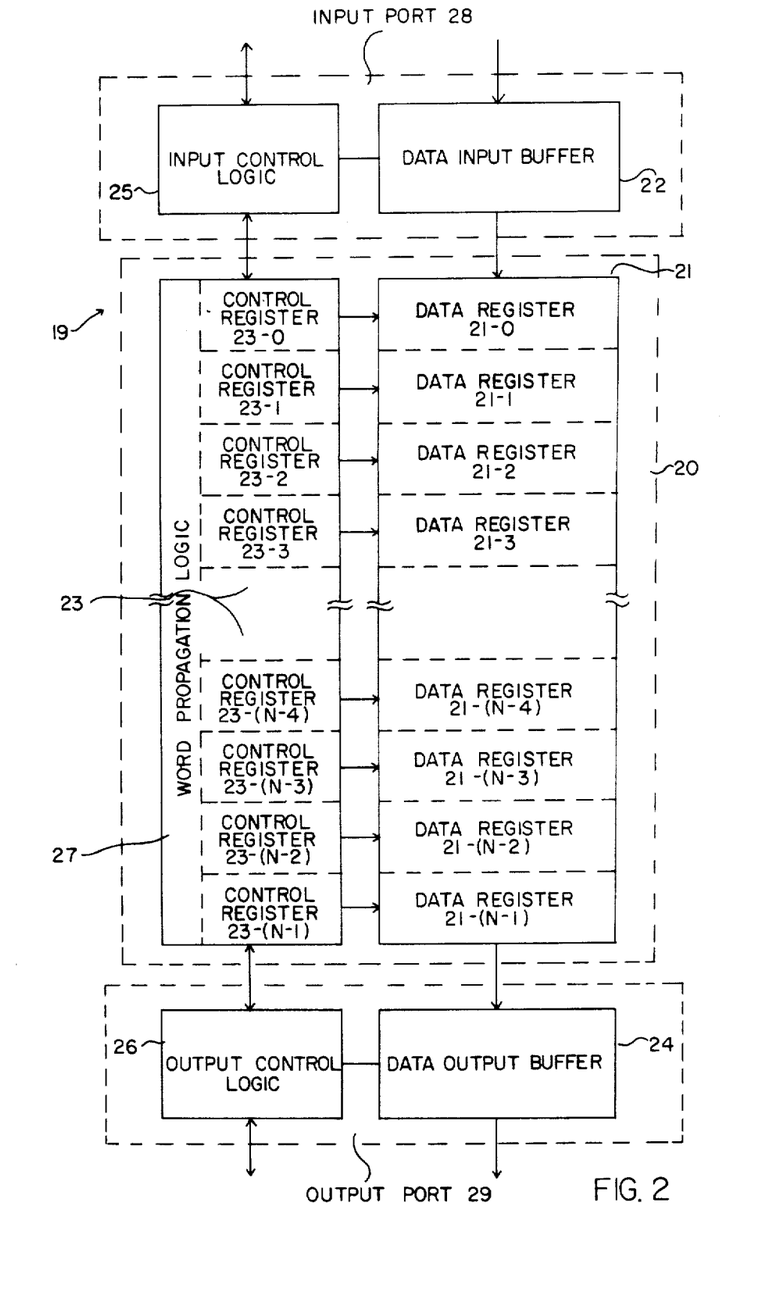
FIG. 2 shows the block diagram of a prior art fall-through FIFO memory system.

The internal organization of a fall-through FIFO memory system 19 is depicted in FIG. 2. The fall-through FIFO memory 20 includes a stack 21 of data registers, numbered consecutively 21-0 to 21-(N−1), a stack 23 of control registers 23-0, . . ., 23-(N−1), and word propagation logic 27.

The operation of this system is analogous to that of a bucket brigade. Each control register 23-0 through 23-(N−1) associated with data registers 21-0 through 21-(N−1), respectively, contains a logical zero if its associated data register is empty and stores a logical one if its associated data register contains information. Consider first the case of an empty memory. For an empty memory, control registers 23-0 through 23-(N−1) will each store a logical zero. When a data word is shifted into fall-through FIFO memory 20 from the input port 28, it is latched into data register 21-0, and control register 23-0 is set to a logical one. When this shifting-in cycle is complete, word propagation logic 27 detects the condition that control register 23-1 stores a logical zero (i.e., that data register 21-1 is empty) and that control register 23-0 stores a logical one (i.e., that data register 21-0 is full), initiates a transfer of data from data register 21-0 to data register 21-1 and resets control register 23-0 to a logical zero so that it indicates that data register 21-0 is empty and sets control register 23-1 to logical one so that it indicates that data register 21-1 is full. In like fashion, the data word will be transferred through each data register of the fall-through FIFO memory consecutively until it reaches data register 21-(N−1). The next word written into the memory will fall-through to data register 21-(N−2); in this fashion, data words will continue to fall-through and stop in data registers consecutively closer to the data input buffer 22 until the fall-through FIFO memory 20 is full. A word may be shifted into data register 21-0 whenever control register 23-0 stores a logical zero; and each word in the memory falls from a given data register to the next lower data register in the stack when the word propagation logic 27 detects that the given control register stores a logical one and the next lower control register stores a logical zero, so that more than one word may be in the fall-through process at a given time. When a data word is shifted out of the memory, the shifting out procedure resets control register 23-(N−1) from a logical one to a logical zero. In the typical fall-through fashion, if control register 23-(N−2) contains a logical one the data word in data register 21-(N−2) will propagate forward to data register 21-(N−1) and appear at the output port 29. All remaining words in the FIFO will successively advance one data register toward the data output buffer 24. Data input is permitted by the input control logic 25 if and only if control register 23-0 at the top of stack 23 contains a logical zero, indicating that data register 21-0 is empty. Similarly, data output is permitted by the output control logic 26 if and only if control register 23-(N−1) at the bottom of stack 23 contains a logical one, indicating that data register 21-(N−1) is full.

One example of a prior art fall-through memory system is contained in U.S. Pat. No. 4,151,609 entitled "FIRST IN FIRST OUT (FIFO) MEMORY", issued to Moss in 1979, which is assigned to Monolithic Memories, Inc., the assignee of this application, and which is incorporated herein by reference.

There are three features of the operation of a fall-through FIFO memory system which are particularly important for comparison with the operation of a pointer-based FIFO memory system. First, there is a significant delay (fall-through time) associated with the propagation of the first word entered into data register 21-0 of an empty fall-through FIFO memory to the last data register 21-(N−1). This delay also exists for the backward propagation of an empty register position from the output data register position (data register 21-(N−1)) back to the input register position (data register 21-0) when a data word is shifted out of a full fall-through FIFO memory. This delay is a direct result of the fact that each data word must pass through every register in the fall-through FIFO memory before it is read out.

Second, there is a serious limitation on shift-in (and shift-out) cycle time that is imposed by the "fall-through" architecture: that is, the theoretical maximum data transfer rate at either the input port 28 or the output port 29 is only 50% of the apparent shifting frequency of the fall-through register stack. The precise reasoning behind this limit is intricate, but can be summarized by noting that the shifting of data into data register 21-0 of two consecutive data words at high speeds requires the following sequence of operations:

1. The first data word is shifted into data register 21-0 of the fall-through stack 21 from the input port 28 via data input buffer 22.
2. The first data word is shifted from the data register 21-0 to the data register 21-1.
3. The second data word is shifted from the data input port into the data register 21-0 as soon as but not prior to the completion of the shift operation described above in step number 2.

The third important feature of fall-through FIFO organization is the constraint that data always moves from the data input port 28 into the same physical memory location, passes through the same sequence of physical memory positions, and moves from the same physical memory location through the data output buffer 24 to the output port 29.

Figure 3:
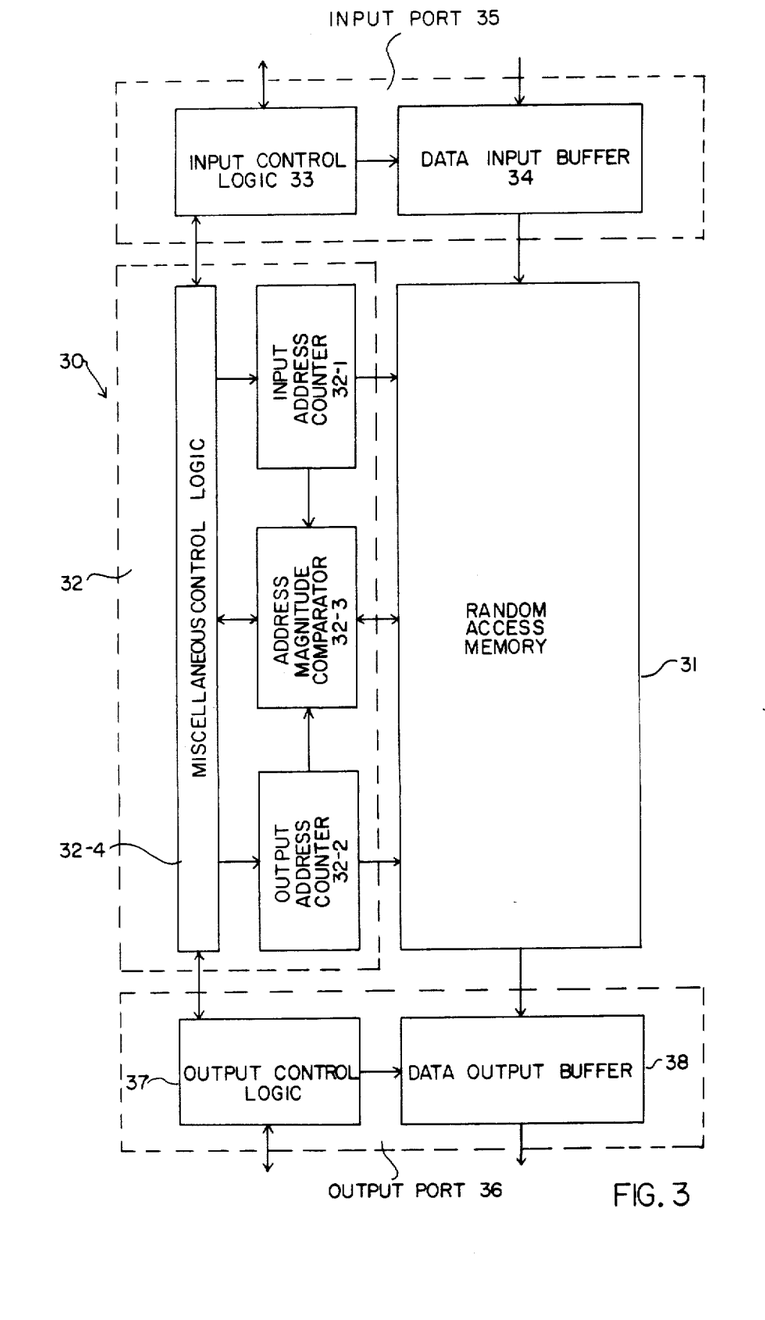
FIG. 3 shows the block diagram of a prior art pointer-based FIFO memory system.

The internal organization of a pointer-based FIFO memory system is depicted in FIG. 3. The pointer-based FIFO memory 30 comprises a random access memory (RAM) 31, which is used for data storage, and control logic 32. Control logic 32 creates the FIFO protocols and controls the interface between the input port 35 and the RAM 31 and also controls the interface between the RAM 31 and the output port 36.

The control logic 32 includes two counters, input address counter 32-1 and output address counter 32-2, an address magnitude comparator 32-3, and miscellaneous control logic 32-4. Input address counter 32-1 generates the address of the storage location where the next data input word is to be stored and output address counter 32-2 generates the address of the storage location from which the next data output word is to be taken. Address magnitude comparator 32-3 compares the two counter addresses currently stored in the input and output address counters 31-1 and 32-2 and identifies if RAM 31 is either full or empty, respectively. Miscellaneous control logic 32-4 generates the internal RAM control signals and provides signals to the input control logic 33 and to the output control logic 37 which indicate the status of the RAM 31 and the control logic 32.

For descriptive purposes the addresses generated by the input and output address counters may be denominated 0, 1, 2, ... N−1, where N is the number of storage locations in the RAM 31 available for storing data words. Each address corresponds to a unique word storage location in the RAM 31.

The operation of the pointer based FIFO memory 30 is straightforward. When initialized the FIFO RAM 31 is empty and both the input and output address counters 32-1 and 32-2, respectively "point" to address 0. (A counter is said to "point" to the address k if k is the number in the counter.) When the first word W(0) is loaded into the FIFO RAM 31 from input port 35 via data input buffer 34, it is loaded into RAM 31 at the word storage location having address 0.

In general, the input address counter 32-1 points to the storage location whose address is k (mod N) where k is the number of data words previously stored (k=0,1,2, ...), and k (mod N) is the integral remainder when k is divided by N. In other words, the input data words W(0), W(1), ..., W(k), ... are stored cyclically in the RAM 31, with data word W(k) being stored in the storage location whose address is k (mod N) for k=0, 1, .... The comparator 32-3 senses when the input address counter points to an address whose storage location is full and then data entry is prohibited by the control logic 32.

In general, the output address counter 32-2 points to the storage location whose address is j (mod N) where j is the number of data words previously read out of the RAM, where j=0,1,2, .... Thus, the data output words are also read out cyclically. Again readout is prohibited by the control logic 32 when the comparator 32-3 senses that the output address counter points to an address whose storage location is empty.

In view of the above formulas it is easy to see that the addresses on the input and output counters are equal if and only if the FIFO RAM 31 is either empty or full. For if the addresses are equal, then k≡j (mod N). Under the constraints imposed above, either k=j in which case the number of data words previously stored equals the number of data words previously read out, i.e., the RAM is empty, or k=(j+N), in which case the number of data words previously stored exceeds the number of data words previously read out by N, the number of word storage locations in the RAM 31, i.e., the RAM 31 is full.

Conversely, if RAM 31 is empty, the number of data words previously stored equals the number of words previously read out, i.e. k=j so k≡j (mod N); and if RAM 31 is full, the number of data words previously stored exceeds the number of data words previously read out by N, i.e., k=(j+N), so again k≡j (mod N). Thus if RAM 31 is empty or full, the addresses k (mod N) and j (mod N) in input address counter 32-1 and output address counter 32-2, respectively, are equal.

The magnitude comparator identifies whether the RAM is empty or full by determining whether k≡j(mod N), and signals the miscellaneous control logic to either allow or prohibit data entry at the input port 35 or allow or prohibit data removal at the output port 36.

One description of a prior art pointer based FIFO memory system is contained in Column 1, lines 47–68 and Column 2, lines 1–58 of U.S. Pat. No. 4,374,428 entitled "EXPANDABLE FIFO SYSTEM", issued to Barnes, Feb. 15, 1983, which is hereby incorporated by reference.

Barnes improves upon this prior art system by providing an expandable number N of individual FIFO devices arranged to form a ring of identical FIFO devices connected in an identical manner where each device comprises a memory having N storage locations and pointing means which directs the writing of words into successive storage locations until read out of the FIFO system.

There are significant differences between the operation of a pointer-based FIFO memory system and a fall-through FIFO memory system. First, there is no fall-through time associated with a pointer-based memory that is akin to that of a fall-through type. There is a delay from data input to available data output, but it is short, caused by a small number of gate delays and not related to the fall-through phenomenon.

Second, the limitation on shift-in and shift-out cycle time in a pointer-based FIFO memory is imposed by a different sequence of events than in a fall-through FIFO memory. With each data shift operation, the pertinent counter must increment, the magnitude comparator must settle, i.e., determine whether or not a full or empty state exists, and the port control signals must be adjusted before the next shift operation can occur. The cycle time increases with the total word size of a pointer-based FIFO memory because larger FIFO memories require longer word addresses and hence longer delays for the settling of the magnitude comparator.

Lastly, in a pointer-based FIFO memory it is apparent that data can be input or output from any physical location in the data memory, due to the fact that a RAM structure is used as the core of the device.

SUMMARY

A FIFO memory system is disclosed which organizes a memory with N word storage locations into M fall-through data columns each of length M/N. A control column is associated with each data column for propagating a data word from the top data register in each column to the bottom data register in each column.

Input control logic, including a pointer, reads incoming data words cyclically into one of M empty data registers at the top of each column. Output control logic, including a pointer, reads previously stored data words cyclically out of one of M data registers at the bottom of each column.

Fall-through delay is inversely proportional to the number M of stacks, and maximum shift rates at input and output ports are at least doubled compared with prior art FIFO memory systems for $M \geq 2$.

BRIEF DESCRIPTION OF THE DRAWINGS

FIG. 4 shows the arrangement of FIGS. 4a and 4b which together show the block diagram of an N-word dual-stack FIFO memory system constructed in accordance with one embodiment of this invention;

FIG. 5 shows the arrangement of FIGS. 5a and 5b which together show the block diagram of an N-word M-stack FIFO memory system constructed in accordance with one embodiment of this invention; and FIG. 6 shows the arrangement of FIGS. 6a -6d which together show the logic diagram of a 64-word dual-stack FIFO memory system constructed in accordance with one embodiment of this invention;

DETAILED DESCRIPTION

Figure 4A:
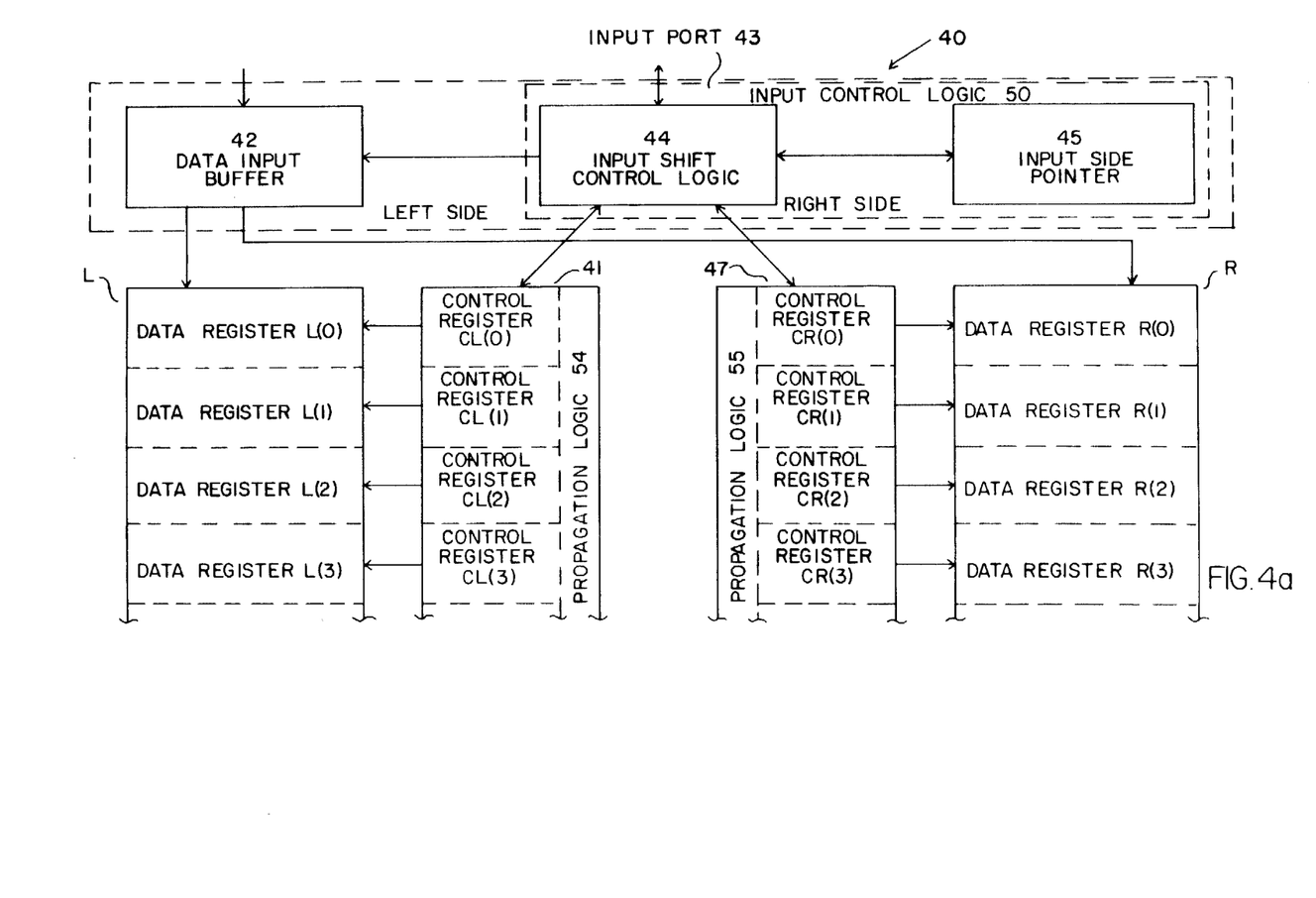
Figure 4B:
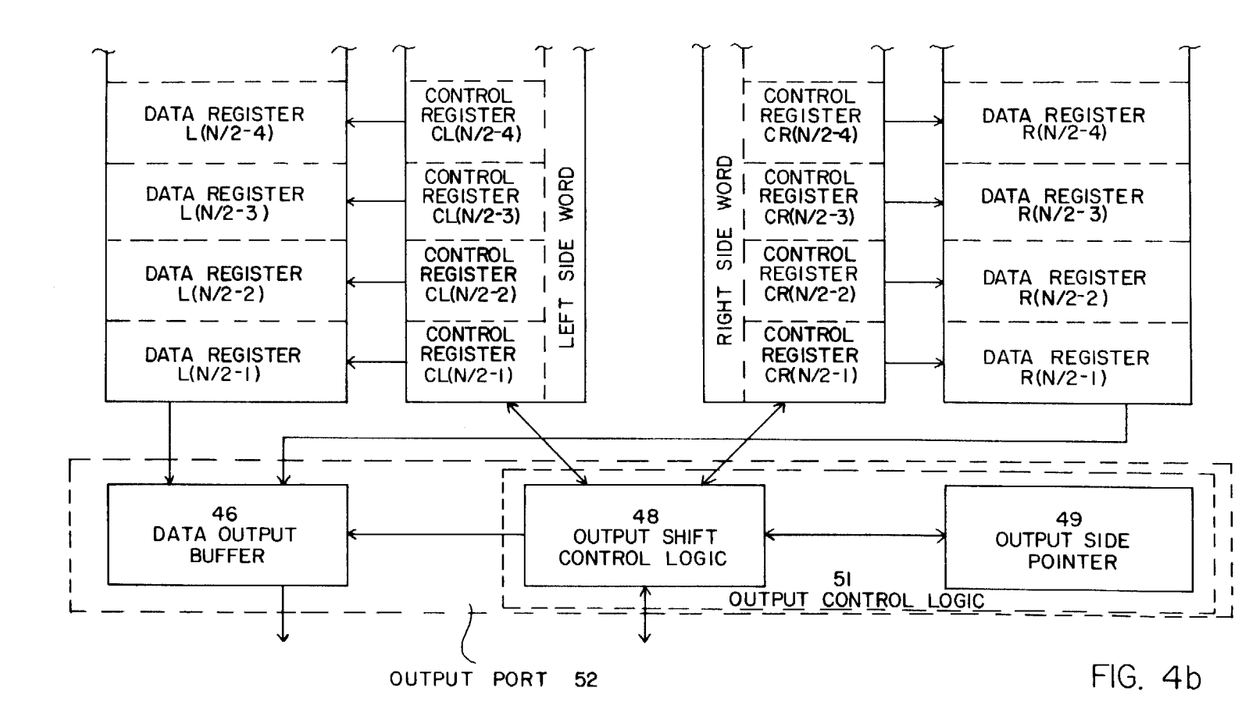

One embodiment of a high speed FIFO memory system constructed in accordance with this invention is depicted in FIG. 4. FIG. 4 is a block diagram showing an N-word dual-stack FIFO memory system 40, where N is an even positive integer.

The input control logic 50 is responsible for creating the input port control signals and interfacing the data input buffer 42 with data registers L(0) and R(0), the initial data registers of the left and right data register stacks L and R respectively.

Data input buffer 42 electrically buffers the input signals which appear at input port 43 and generates the voltage levels of the data input signals required by the data registers L(0) and R(0).

The input side pointer 45 directs input shift control logic 44 to operate alternately on the two fall-through stacks L and R.

Similarly output control logic 51 includes output side pointer 49 which directs output shift control logic 48 to operate alternately on the two stacks L and R. Data output buffer 46 electrically buffers the signals representing a data word read out of the selected data register $L((N/2)-1)$ or $R((N/2)-1)$.

Each control register in the right stack 47 and the left stack 41 contains a logical zero if its associated data register is empty and contains a logical one if its associated data register is full, i.e., stores a data word. When the memory system 40 is initialized, each control register $CR(0)$ through $CR((N/2)-1)$ in the right control register stack 47 and each control register $CL(0)$ through $CL((N/2)-1)$ in the left control register stack 41 is set to a logical 0 signifying that their associated data registers $R(0)$ through $R((N/2)-1)$ and $L(0)$ through $L((N/2)-1)$ do not contain data. When the memory system 40 is initialized, the input side pointer 45 and the output side pointer 49 both point to the left stack L.

The first data input word W(0) enters the data register L(0) of the left fall-through stack L and propogates under the control of the left side word propagation logic 54 to the bottom data register $L((N/2)-1)$ of the left fall-through stack where it remains until shifted out. The second data word W(1) shifted in, directed by the input side pointer 45, is stored in the data register R(0) of the right fall-through stack R and propagates under the control of the right side word propagation logic 55 to the bottom register $R((N/2)-1)$ of the right fall-through stack where it remains until shifted out.

In general, the data word W(k) is shifted into data register L(0) if k is even and into data register R(0) if k is odd, for k=0, 1, 2, . . . (This convention could of course be reversed.)

Once a data word has entered an initial register L(0) or R(0) of a fall-through data stack, it propagates through the stack of data registers to the non-empty data register nearest the data output buffer 46.

The right side word propagation logic 55, the right stack of control registers 47 and the right stack of data registers R form an (N/2)-word fall-through FIFO memory stack which operates as described for element 20 of FIG. 2.

Similarly, the left side word propagation logic 54, the left stack of control registers 41 and the left stack of data registers L from an (N/2)-word fall-through FIFO memory stack which operates as described for element 20 of FIG. 2.

Once the memory system 40 has been initialized, the output shift control logic 48, under the direction of the output side pointer 49, determines if data is present in data register $L((N/2)-1)$. When data is present, the output shift control logic 48, under the direction of the output side pointer 49, alternately shifts data from data register $L((N/2)-1)$ and data register $R((N/2)-1)$, respectively, to the data output port 52 as long as data is available.

FIG. 6 shows a logic diagram of one embodiment of a 64-word dual stack FIFO memory system constructed in accordance with this invention which allows the storage of 64 five bit words in two "fall-through" stacks, each capable of storing 32 five bit words.

Block 85 is the right fall-through stack of data registers labeled RDR(0) through RDR(31) and the function of each right data register is to store a data word.

The right control register stack 87 includes control registers labeled RCR(0) through RCR(31). A logical 1 is stored in a right control register if and only if the corresponding data register contains a data word. The right side word propagation logic 86 includes gates RG(1) through RG(31). A data word is transferred from a given right data register to the right data register immediately beneath it if and only if the right control register corresponding to the given right data register contains a logical 1 and the right control register immediately beneath it contains a logical zero.

Blocks 88, 90 and 89 are the left stack of data registers, the left stack of control registers and the left side word propagation logic respectively, and function analogously to the corresponding blocks 85, 87 and 86 as previously explained.

Input port 95 includes input control logic 83 and data input buffer 84. In turn, input control logic 83 includes input shift control logic 82 and input side pointer 81.

Data input buffer 84 buffers the electrical signals from external circuitry and provides the buffered signal to the data register stacks 85 and 88.

Input side pointer 81 directs the input shift control logic 82 to direct input data alternately into either the left or right data register stacks 88 or 85 respectively. Input side pointer 81 includes a latch which changes state from a logical one to a logical zero or from a logical zero to a logical one as each data word enters the FIFO memory 80. When the latch contains a logical one, the next input data word is stored in the top register of the left data register stack 88.

Input shift control logic 82 includes NAND gates 82-3 through 82-7 and latch 82-8. One function of circuit 82 is to interface with external circuitry (not shown) via shift-in lead SI and input ready lead IR. Input ready, IR, provides signals to the user indicating whether words may be shifted into the FIFO 80. An active low pulse from shift-in left gate 82-3 triggers word entry and subsequently propagation down the left data stack 88. The shift in right gate 82-4 operates analogously for the right data stack 85.

Input ready right sense gate 82-7 senses when the right data register stack 85 is ready to receive data, and input ready left sense gate 82-6 provides a similar function for the left data register stack 88. Input ready buffer 82-5 receives input signals from the respective left and right input ready sense gates 82-6 and 82-7. A high output signal from buffer 82-5 on input ready lead IR indicates to the user that FIFO memory 80 is ready to receive data.

Shift-in-hold latch 82-8 functions chiefly in a dynamic sense, i.e., when a user shifts a word into the FIFO 80, the existence of latch 82-8 allows him to shift in exactly one word every time he raises shift-in signal SI high. Because the internal operation of the device is dynamic and a word that is shifted in is physically carried away from the data input buffer 84 by the internal circuitry, shift-in-hold latch 82-8 prevents a long duration shift-in signal from appearing as multiple shift-in signals. That is, shift-in-hold latch 82-8 is set to a logical zero whenever a shift-in cycle begins (SI goes high) and does not go high again until SI goes low. The logical zero state of the shift-in-hold latch logically prevents input ready signal IR from going high, thus precluding any additional data entry until SI is brought low.

Output port 96 includes data output buffer 91 and output control logic 94. In turn output control logic 94 comprises output shift control logic 93 and output side pointer 92. The circuitry in the output port 96 serves the analogous functions as the corresponding devices in the input port 93. For example, the data output buffer 91 buffers the electrical signals received from a selected one of the bottom data registers in data register stacks 85 and 88 and provides the buffered signals to external circuitry (not shown). The only additional function for the output port 96 that does not exist for the input port 95 is that the output shift control logic 93 also provides direction to the data output buffer 91 as to which data register column 85 or 88 data should be taken from and presented to outside circuitry; this selection is made under the direction of the output side pointer 92.

Figure 7:
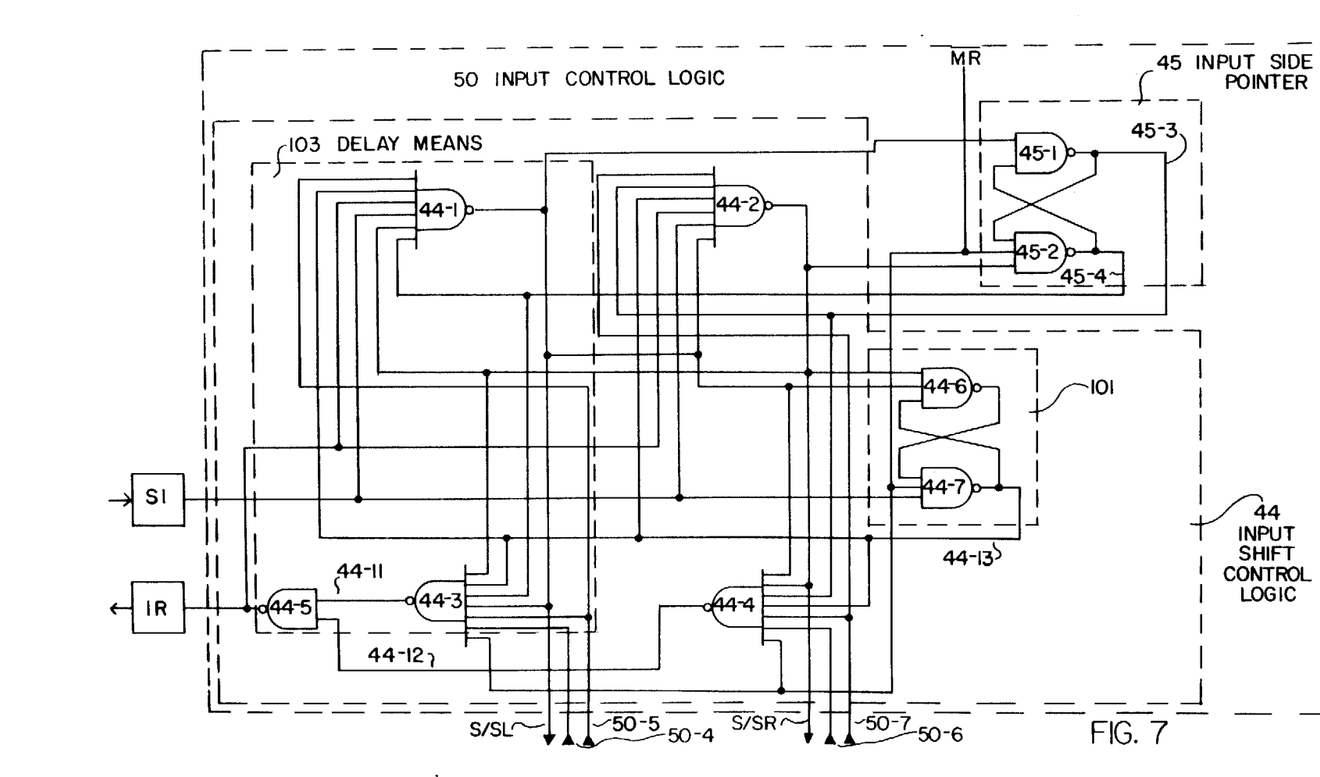
FIG. 7 shows the logic diagram of one embodiment of the input control logic for a dual stack FIFO memory system.

A particular implementation of input control logic 50 (shown in FIG. 4) for a dual stack FIFO organization is depicted in FIG. 7. Input control logic 50 includes input side pointer 45 and input shift control logic 44. Input side pointer 45 includes two NAND gates 45-1 and 45-2 configured in a well known manner to operate as a bistable latch. The output lines 45-3 and 45-4 of the input side pointer 45 provide input signals to the input shift control logic 44 and the logical state of these signals serves to direct input shift control logic 44 to shift the sequence of incoming data words alternately (every other word) into the left and right data stacks L and R, respectively, shown in FIG. 4. Signal line SISL (shift in start left) and signal line SISR (shift in start right) and signal line $\overline{MR}$ (Master reset) are the three input lines of input side pointer 45. In the quiescent state of operation, that is when no data input activity is currently in progress in the FIFO 40 (shown in FIG. 4), all three of these input lines are in a logical one state and input side pointer 45 functions as a memory element and retains its current state. Only one of lines SISL, SISR, and $\overline{MR}$ will ever be a logical zero at a given time. The master reset line $\overline{MR}$ is active (logical zero) only while the entire FIFO 40 is being initialized for operation. A logical zero on signal line $\overline{MR}$ causes a logical one on signal line 45-4 regardless of the data originally stored by input side pointer 45. The combination of a logical one on line 45-4 and a logical one on line SISL creates a logical zero on line 45-3. When the master reset signal is removed, i.e., when signal line $\overline{MR}$ goes high, the input side pointer 45 holds a logic state in which the output signal of NAND gate 45-2 is high and the output signal of gate 45-1 is low. The selection of which logic state to configure latch 45 in at master reset is design choice. The selection made in the embodiment shown in FIG. 7 is to configure the input control logic to shift the first data word entered into the FIFO 40 into the topmost register L(0) of the left data stack L.

The input shift control logic 44 includes NAND gates 44-1 through 44-7. Gates 44-6 and 44-7 are connected together to create a bistable latch 101. The input shift control logic 44 has three output lines, line SISL (shift in start left), line SISR (shift in start right), and line IR (input ready). Line IR provides a signal which is available to the user of the device for use in external circuitry and serves to indicate when the FIFO 40 is available to receive data words, i.e., when the topmost control register in a selected data stack stores a logical zero. Line SISL provides an input signal to the input side pointer 45, to the left control register stack 41 and to the left side word propagation logic 54 shown in FIG. 4. As an input signal to the left control register stack 41, this signal SISL, when low, sets control register CL(0) to a logical one to signify that data register L(0) is full. The transition of the SISL signal to a logical one (high) allows the word entered in data register L(0) at the top of the stack L to begin propagating downward in typical fall through fashion. In addition the signal on line SISL serves as an input signal to the input side pointer 45 and causes the data stored therein to change state thereby enabling the subsequent data word entered into the FIFO 40 to be entered into the top register R(0) of the data register stack R. Similarly, signal line SISR provides a signal that causes data propagation in the right fall through stack R and that resets the input side pointer 45 to direct a subsequent data word into the top data register L(0) in the left fall through stack L. The input shift control logic 44 has eight input lines: the master reset line $\overline{MR}$; the shift in line SI; lines 45-3 and 45-4, the two output lines of the input side pointer 45 whose signals serve to inform the input shift control logic 44 whether entering data should be shifted to the left or right data stacks; lines 50-4 and 50-5, whose signals together indicate when the left fall through stack L is ready to receive additional data, i.e., that control register CL(0) stores a logical zero; and lines 50-6 and 50-7, whose signals together serve to indicate when the right fall through stack R is ready to receive additional data. One function of the output signal of gate 44-1 is to initiate data entry and propagation down the left data stack. Secondly, it signals the input side pointer 45 to toggle, thus enabling a subsequent data word to enter the right data stack R, and also signals gate 44-3, gate 44-4 and latch 101 that a data word is being shifted into FIFO 40. Gate 44-2 functions analogously to gate 44-1 but for the right side of the FIFO 40. NAND gate 44-3 functions to sense when the input shift control logic 44 together with the left fall through data stack L is ready to receive additional data. Gate 44-4 functions analogously to gate 44-3 but for the right data stack R. Gate 44-5, which creates the signal on input ready line IR, senses through input signals on lines 44-11 and 44-12 when either the left data stack L or the right data stack R is ready to receive data. A low signal on line 44-11 indicates that the first data register L(0) in data register stack L is ready to receive a data word. A low signal on line 44-12 indicates that the first data register R(0) in data register stack R is ready to receive data. In operation by the logic design, only one line 44-11 or 44-12 will ever be low at a given time, which is to say that only one of the left and right fall through stacks is ready to receive data at a given time. The circuit is designed such that even though both stacks L and R might have room for data in the registers L(0) and R(0) at the top of each stack, the input side pointer 45 provides input signals to NAND gates 44-3 and 44-4 such that only one of the lines 44-11 and 44-12 is low at any given time.

All of the gates 44-1 through 44-7 in the input shift control logic 44 and the gates 45-1 and 45-2 in the input side pointer 45 have approximately the same gate delay and this common gate delay is used as the unit of time in explaining the operation of the input control logic 50.

The latch 101 formed by gates 44-6 and 44-7 is used to provide an output signal indicating that a shift in sequence has begun but has not been completed. A typical shift-in sequence occurs as follows. With input ready line IR high, shift-in line SI is raised from a low to a high thus initiating the shift-in sequence. For example, when the side pointer 45 is set to initiate activity in the left side of the FIFO 40, one gate delay after the shift in line SI goes high, signal line SISL goes low. One gate delay later, signal line 44-11 goes high and one gate delay after that the input ready line IR goes low. If, however, shift-in line SI remains high for any period of time extending beyond the time at which input ready line IR goes low, the input side pointer 45 changes logical states, enabling gate 44-2 for what will be the entry of the next data word. The change in state of the input side pointer 45 would also, were it not for the existence of the latch 101, allow gate 44-4 to detect a ready condition at the top of the right data stack, subsequently allowing input ready line IR to go high. This would cause a word to be entered into the top data register R(0) of the right stack, which should not happen until SI is brought low and then high again. Latch 101 prevents this from occurring as follows. One gate delay after the shift-in sequence begins with the shift-in line SI going high, the signal on line SISL goes low, which causes the level on signal line 44-13 to go from a logical one to a logical zero and to remain low until the shift-in line SI is brought low again by the user. The low level on line 44-13, which serves as an input signal to gates 44-1, 44-2, 44-3 and 44-4, prevents gates 44-3 and 44-4 from signifying that either stack L or R is ready to receive data because the shift in sequence that is in progress is incomplete. The low level on line 44-13 likewise prevents logic gates 44-1 and 44-2 from providing an additional low signal on their output lines SISL and SISR respectively until the shift in sequence in progress is completed by the lowering of the shift-in signal on line SI. Finally, it should be noted that the start of a shift in sequence creates only a transient logic level (low) on signal line SISL or SISR. The duration of this transient low level has been selected to be as short as possible and still maintain proper function of the input shift control logic 44 as it interfaces with the control stacks 41 or 47 on either the left or right side of the FIFO 40. The duration of the transient low signal on either one of the lines SISL or SISR exists for approximately three gate delays. A typical shift-in cycle has input ready line IR high when shift-in line SI is raised high. Line SISL goes low one gate delay after shift-in line SI is brought high. Line 44-11 goes high two gate delays after shift in line SI is raised high. Input ready line IR goes low three gate delays after shift in line SI is raised high and because the signal on line IR is an input signal to gate 44-1, line SISL becomes high again after four gate delays. This three-delay-gate duration of the low-level signal on SISL (and also SISR) is considered optimal in the design of the input shift control logic.

The gates 44-1, 44-3 and 45-5 function together as a delay means 103 having two input leads SI and IR and an output lead SISL. The leads SI and IR are input leads to gate 44-1 and the output lead SISL of 44-1 serves as an input lead to gate 44-3 whose output lead 44-11 serves as an input to gate 44-5. The output lead of gate 44-5 is lead IR.

Delay means 103 controls the duration of the active (low) pulse on lead SISL. The signal on lead SISL goes low 1 gate delay after the input signals on lead SI and IR are both high, and goes high again 3 gate delays after it goes low.

Similarly, the gates 44-2, 44-4 and 44-5 serve as a delay means for controlling the duration of the low pulse on the lead SISR, and analogous delay means are employed in the output shift control logic 48. Output shift control logic 48 and output side pointer 49 function similarly to input shift control logic 44 and input side pointer 45, respectively.

The N-word dual-stack memory system 40 (FIG. 4) has several advantages over a typical prior art fall-through FIFO memory system:
1. Fall-through delay is halved because of the splitting of the prior art single fall-through stack into two equal stacks.
2. The theoretical limit of maximum shift-in (shift-out) frequency is doubled because the delay due to the internal shift from position "0" to position "1" is removed from the cycle. It is the switching from side to side that removes this delay from the minimum shift cycle.

Figure 5A:
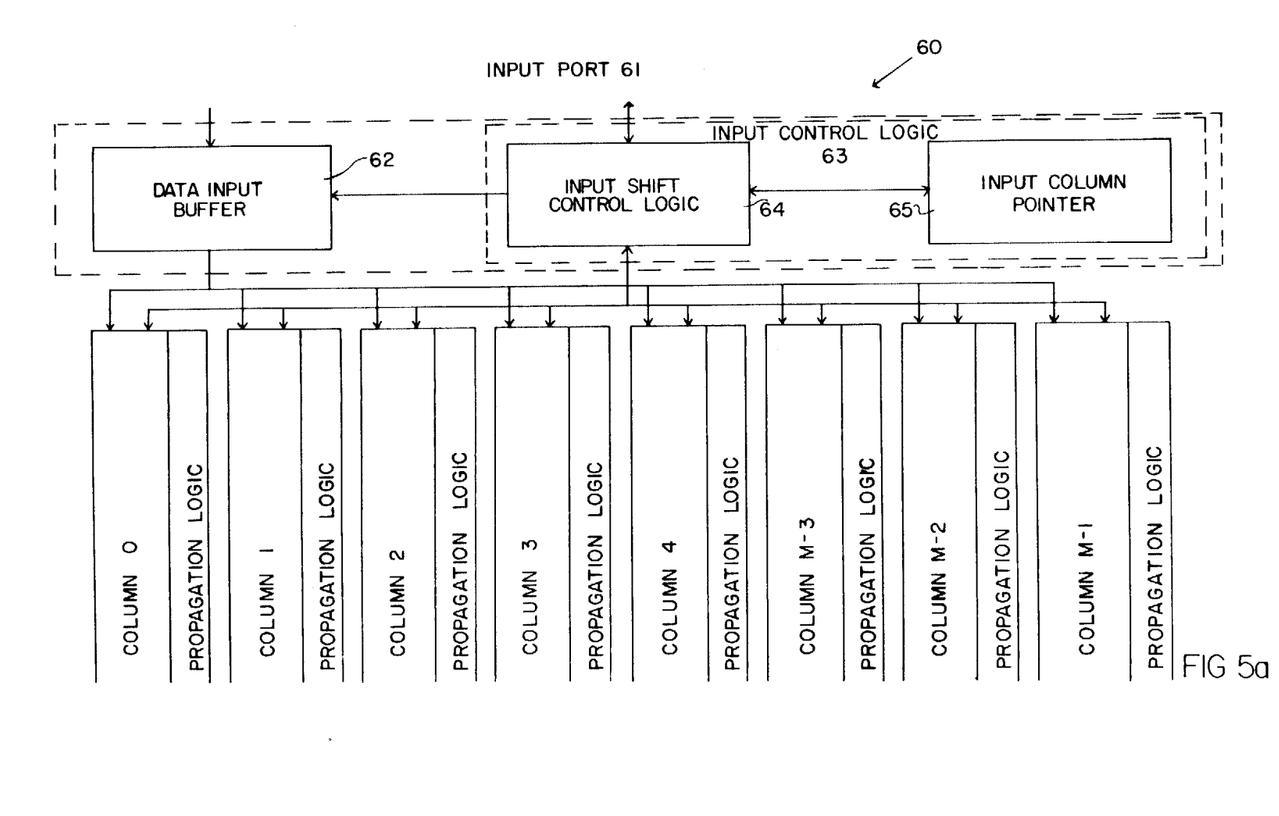
Figure 5B:
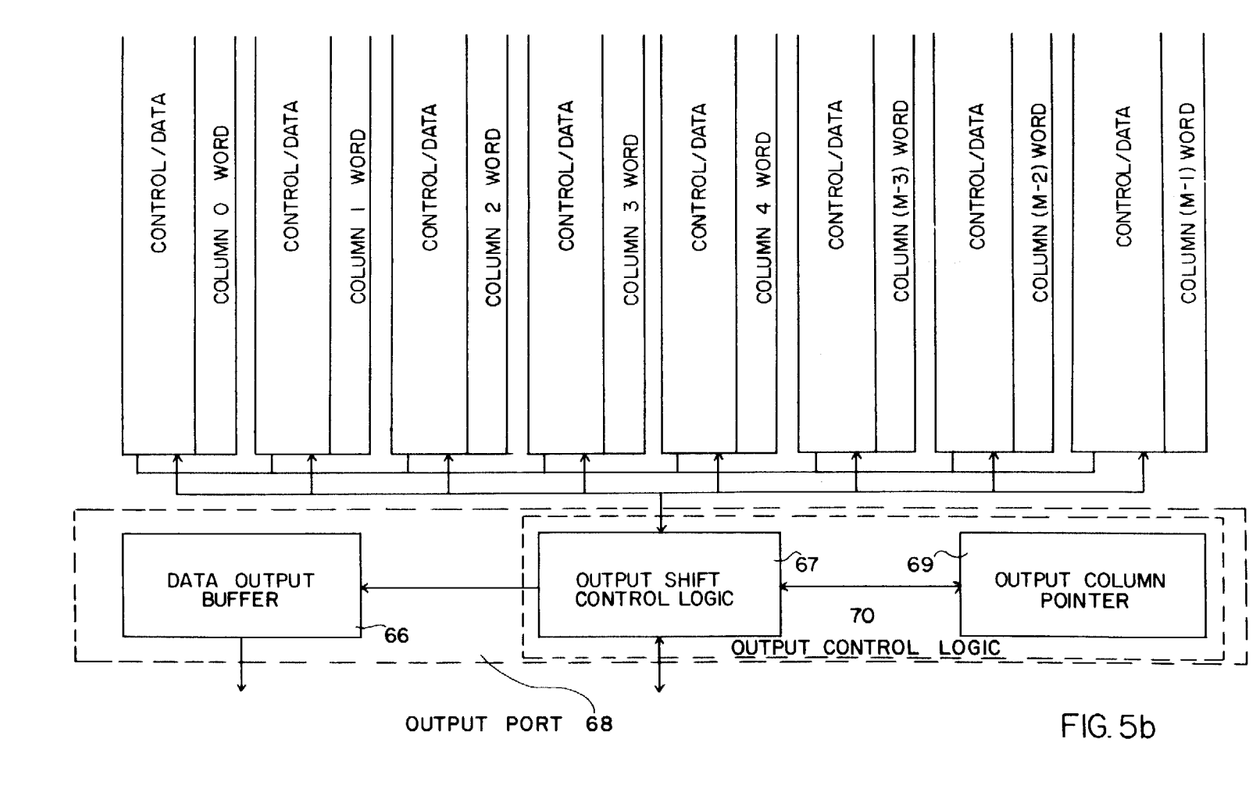
Figure 6A:
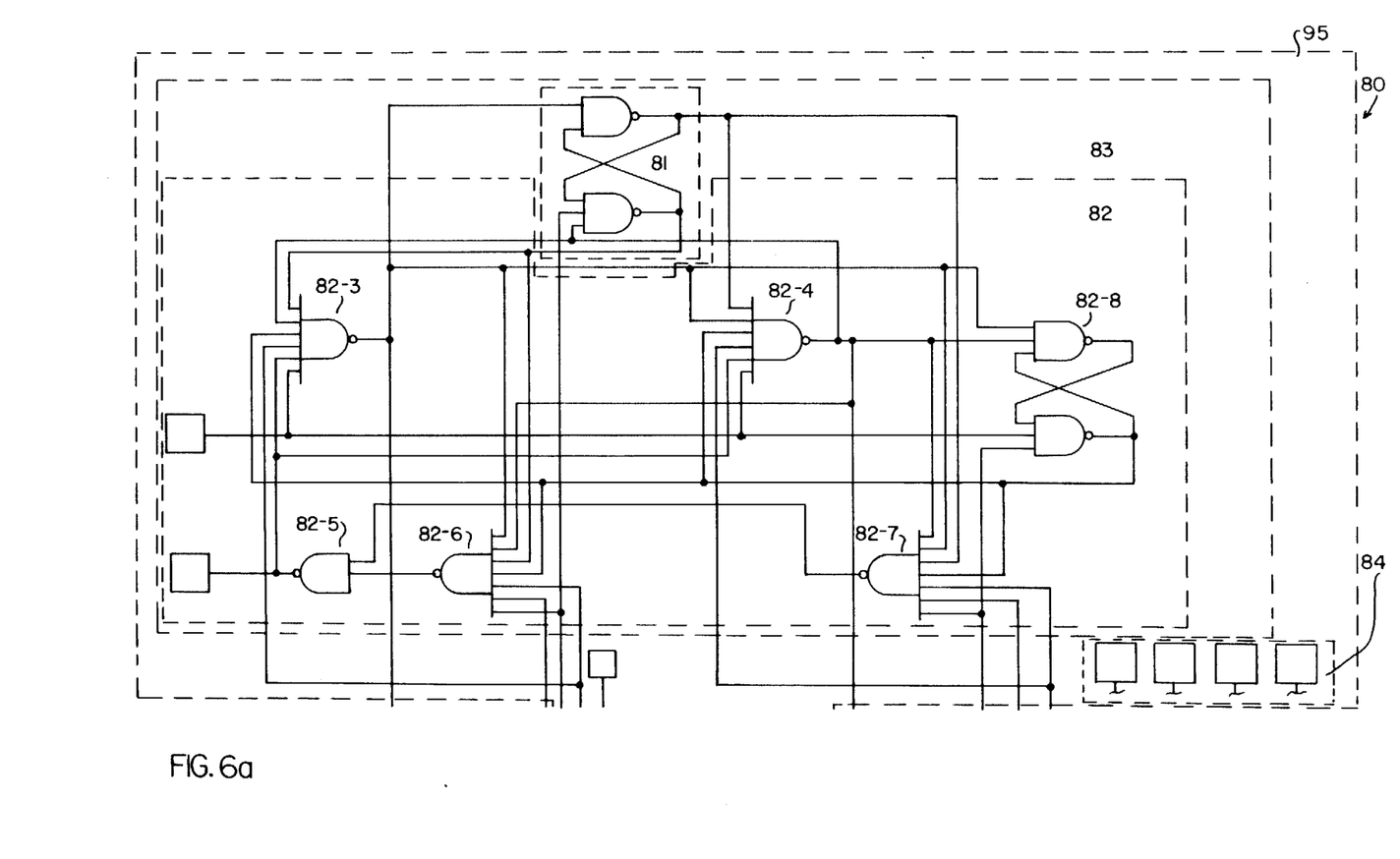
Figure 6B:
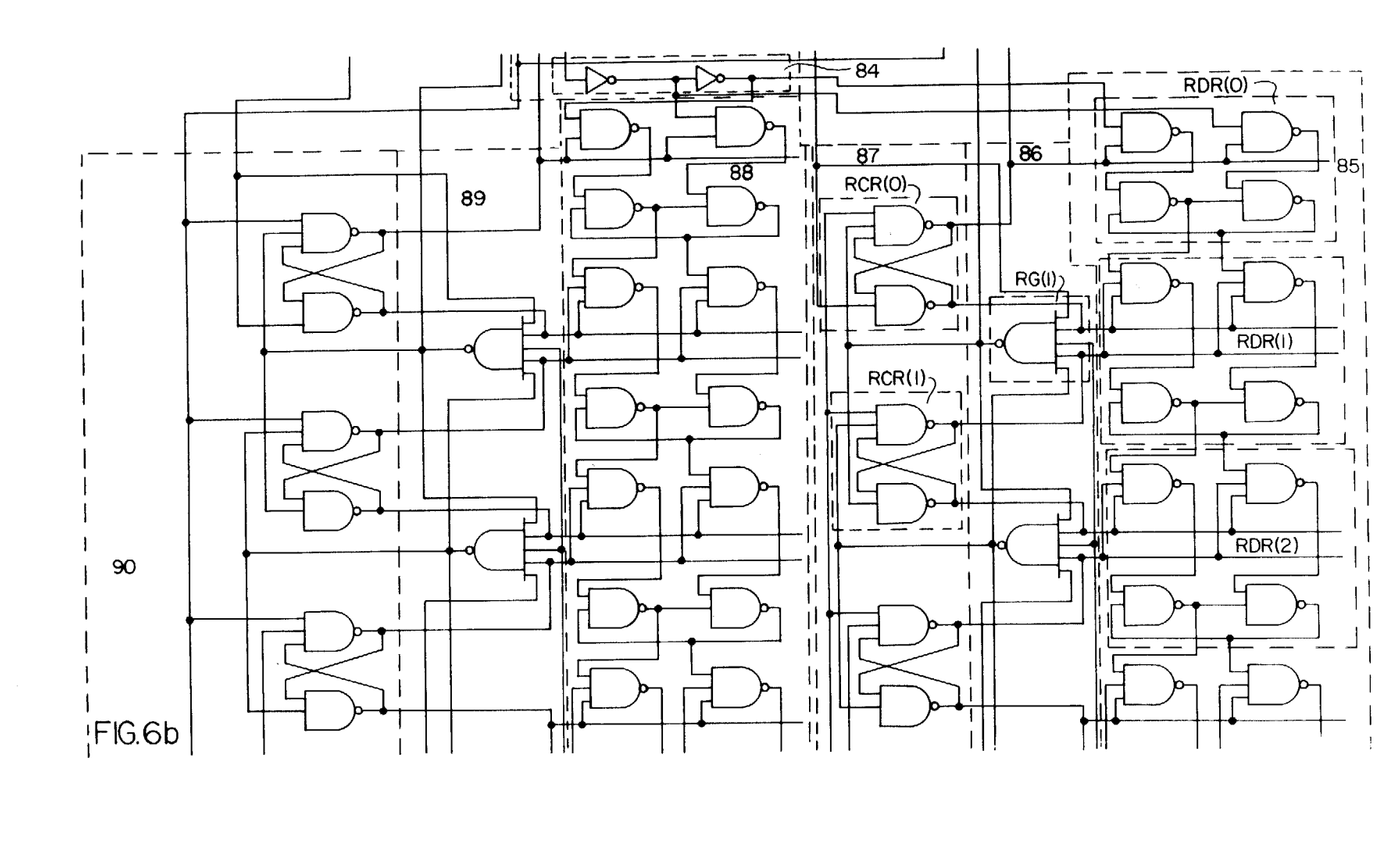
Figure 6C:
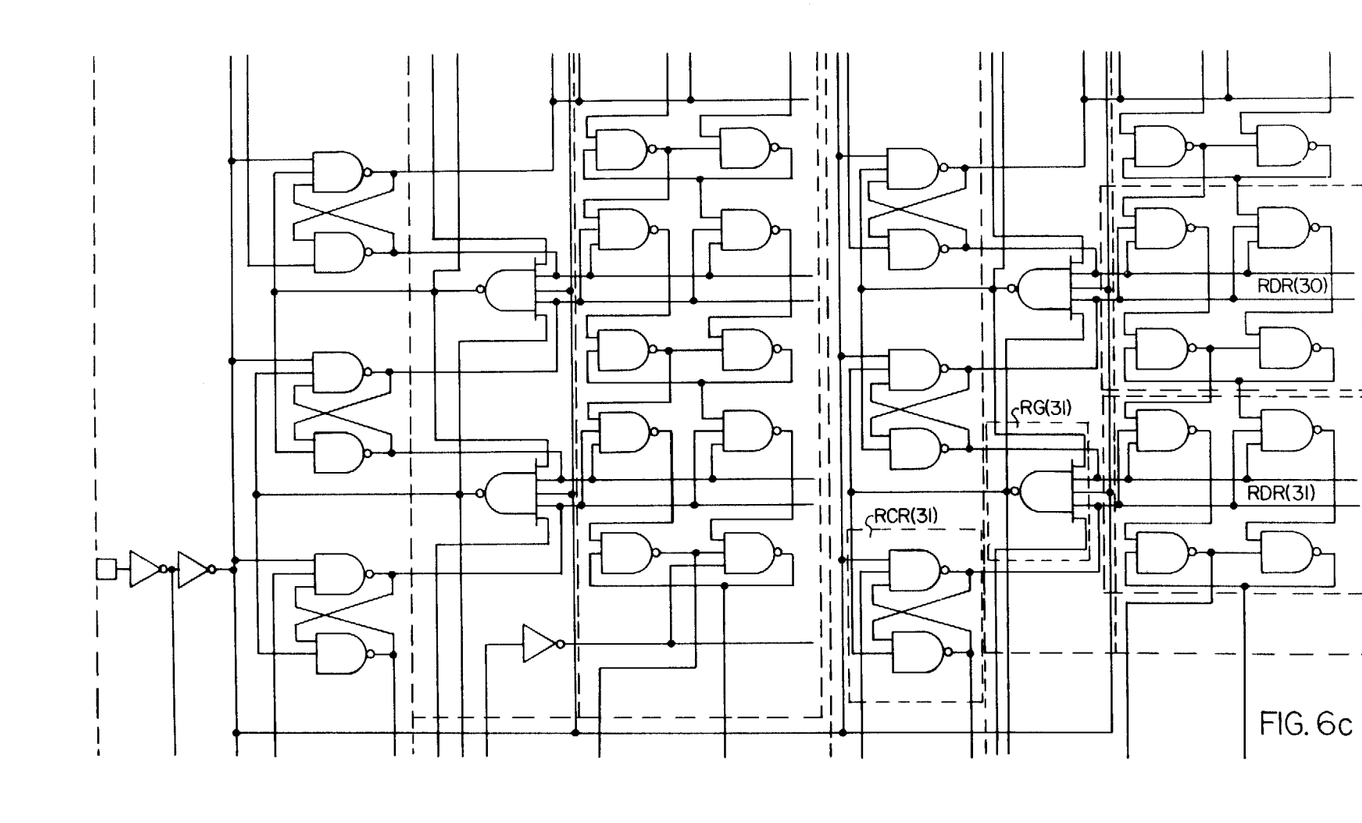
Figure 6D:
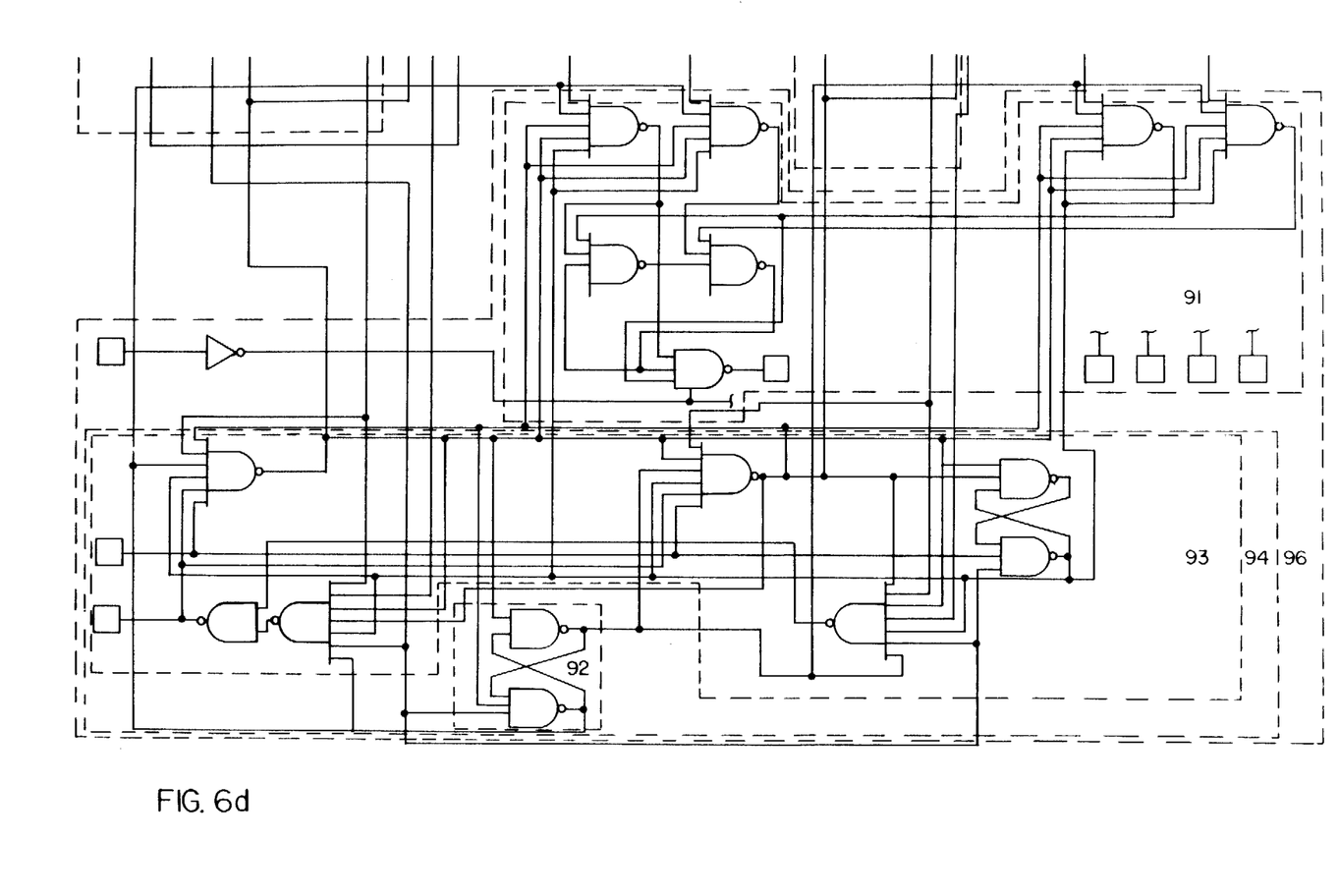

In accordance with the teachings of this invention, an N-word M stack memory system 60 is constructed where M is any positive integer $\geq 2$ satisfying $N \equiv 0$ (mod M), i.e., M divides N evenly. Note that when $M = N$, there is one fall-through "stack" for each word storage location in the RAM. A block diagram of one embodiment of this M M divides N evenly. Note that when $M = N$, there is one fall-through stack architecture is depicted in FIG. 5. An N-word memory is organized into M stacks of (N/M) word data registers per stack.

Each data column in FIG. 5 is formed of a fall-through column of data registers DR (k, 0), ..., DR (k, (N/M)) for $k = 0, ..., M-1$.

Each control column in FIG. 5 comprises a column of N/M control registers CR (k, o), ..., CR (k, (N/M) − 1) for $k = o, ... M - 1$ and miscellaneous word propagation logic for propagating a data word in data register DR (k, j) to DR (k, j+1) if and only if DR (k,j+1) is empty, $k = 0, ..., M-1$; $j = 0, ..., (N/M) - 2$. Each control column has a word propagation logic.

The kth data column, control column, and word propagation logic functions as explained for element 20 of FIG. 2.

The input port 61 includes data input buffer 62 and input control logic 63.

The input control logic 63 includes input shift control logic 64 and input column pointer 65 and directs the sequence data of input words W(i), $i = 0, 1, ...$, in the order received, into the memory where the data word W(i) is shifted into the data register DR (i (mod M),0) only if this data register is empty. Data input buffer 62 functions analogously to data input buffer 42 in FIG. 4.

The output control logic 70 includes output shift control logic 67 and output column pointer 69. The output control logic 70 shifts the data word W(0) out of data register DR (0, (N/M) − 1) and shifts the data word W(i) out of the data register DR ((i mod M),(N/M) − 1) only if the data word W(i − 1) has previously been shifted out of data register DR ((i − 1) (mod M), (N/M) − 1) for $i = 1, 2, ...$ Data output buffer 66 functions analogously to data output buffer 46 in FIG. 4.

The input port 61 and output port 68 may, if desired, be operated asynchronously.

Increasing the number of stacks M in an N-word memory has a number of advantages. First, there is an obvious reduction in fall-through delay, which is inversely proportional to the number of stacks. Secondly, the maximum shift rates at the input and output ports can be increased to a rate which is essentially limited by the technology employed to implement the control logic; that is, theoretically, the M-stack FIFO memory system of this invention in a world with an ideal control logic has M times the available port speed as a prior art single stack FIFO memory. In practice, this M fold improvement is not achievable due to the time required to perform the logical operations required of the control logic.

For the embodiment described in FIG. 6, when implemented as an integrated circuit in a bipolar Schottky technology, the maximum shift rate at the input port or output port is increased by very nearly a factor of 2, and additional stacks in this technology would not increase this rate for operation of the circuit at equivalent power levels.

Thirdly, in certain IC circuit technologies, e.g., bipolar or NMOS which require D.C. power consumption, for a given maximum shift rate at the input and output ports, the power required for propagating the sequence of data words through an M-stack FIFO decreases as M increases due to the slower speed of propagation within each stack required for the given port shift rate as the number of stacks increases. This is essentially due to the increased time for the column pointer to cycle from a given stack through all the stacks and return to the given stack.

While several embodiments of the invention have been described, the description is meant to be explanatory and not limiting. It will be understood by one skilled in the art that various modifications and substitutions may be made therein without departing from the spirit and scope of the invention.

I claim:
1. A FIFO memory system comprising
a memory having N word storage locations arranged in M fall-through columns 0, ..., M − 1 where $M \geq 2$ and $N \equiv 0$ (Mod M) and where the kth fall-through column comprises data registers DR(k,0), ..., DR(k, N/M − 1) for $k = 0, ..., M - 1$;
an input port for receiving a sequence of data words W(i);
a column of control registers CR(k,0), ..., CR(k, (N/M) − 1) for $k = 0, ..., M - 1$ for propagating a data word in data register DR(k,j) to data register DR(k,j+1) if and only if data register DR(k,j+1) is empty, $k = 0, ..., M - 1$; $j = 0, ..., (N/M) - 2$;
a word propagation logic WPL(k) for each column $k = 1, ... M - 1$ for detecting when a control register CR(k,j) indicates that its associated data register DR(k,j) is empty or full and for initiating a transfer of data from data register DR (k,j) to DR(k,j+1) when DR(k,j) is full and DR(k,j+1) is empty, $k = 0, ... M - 1$; $j = 0, ..., (N/M) - 2$.
an input data buffer for receiving said sequence W(i), $i = 0, 1, ...$, of data words (where $i < j$ if and only if W(i) is received before W(j) and for presenting said sequence of data words to said data registers DR (k,0) for $k = 1, ..., (M - 1)$;
an input control logic for directing said input port to shift said data words W(i), $i = 0,1 ...$, in the order received by said input data buffer into said data registers DR (k,0) for $k = 1, ..., (M - 1)$ so that the data word W(i) is shifted into the data register DR(i(mod M),0) only if data register DR(i(mod M),0) is empty;
an output port for presenting said sequence of data words W(i), to an external circuit;
an output data buffer for receiving said data words from the data registers DR(k,(N/M) − 1) for $k = 0, ..., M - 1$, and for presenting said data words at said output port; and an output control logic for directing said output data buffer to sense the data word W(0) from the data register DR (0, (N/M)−1) and to present the sensed data word W(0) to the output port, and for shifting the data word W(0) from the data register DR (0,(N/M)−1), and for directing said output data buffer to sense the data word W(i) from the data register DR (i(mod M), (N/M)−1) and to present the sensed data word W(i) to the output port only if data word W(i−1) has previously been sensed from data register DR ((i−1)(modM), (N/M)−1) and presented to the output port where i=1, 2, . . . , and for shifting the data word W(i) from the data register DR (i mod M, (N/M)−1).

2. The system in claim 1 where M=2.

3. The system in claim 1 or 2 wherein said input control logic comprises an input shift control logic and an input side pointer.

4. The system in claim 1 or 2 wherein said input control logic comprises a delay means having a first input lead for receiving a first predetermined potential, a second input lead for receiving a second predetermined potential, and an output lead for providing a third predetermined potential for a first predetermined period of time a second predetermined period of time after said first predetermined potential is applied to said first input lead and said second predetermined potential is applied to said second input lead.

5. The system in claim 4 wherein said first predetermined period of time is 3 gate delays.

6. The system in claim 4 wherein said second predetermined period of time is one gate delay.

7. The system in claim 4 wherein said delay means comprises a first gate having a first input lead connected to said first input lead of said delay means, a second input lead connected to said second input lead of said delay means, and an output lead connected to said output lead of said delay means;

a second gate having an input lead connected to said output lead of said first gate and having an output lead;

a third gate having an input lead coupled to said output lead of said second gate and having an output lead coupled to said second input lead of said first gate.

8. The system in claim 1 or 2 wherein said output control logic comprises an output shift control logic and an output side pointer.

9. The system in claim 1 or 2 wherein said output control logic comprises a delay means having a first input lead for receiving a first predetermined potential, a second input lead for receiving a second predetermined potential, and an output lead for providing a third predetermined potential for a first predetermined period of time a second predetermined period of time after said first predetermined potential is applied to said first input lead and said second predetermined potential is applied to said second input lead.

10. The system in claim 9 wherein said first predetermined period of time is 3 gate delays.

11. The system in claim 9 wherein said second predetermined period of time is one gate delay.

12. The system in claim 9 wherein said delay means comprises a first gate having a first input lead connected to said first input lead of said delay means, a second input lead connected to said second input lead of said delay means, and an output lead connected to said output lead of said delay means;

a second gate having an input lead connected to said output lead of said first gate and having an output lead;

a third gate having an input lead coupled to said output lead of said second gate and having an output lead coupled to said second input lead of said first gate.

13. A FIFO memory system characterized by a memory having N word storage locations arranged in M fall-through column 0, . . . M−1 where N is≧2 and N≡0 (Mod M) and where the Kth fall-through column comprises data registers DR(K,0), . . . , DR(k, N/M−1) for k=0, . . . , M−1;

means for writing a sequence of data words cyclically into said data registers DR(k,0) for K=0, . . . , M−1; and means for reading out of said data registers a sequence of data words cyclically so that the sequence of input data words that are written is preserved during the reading out of said data words.

* * * * *